Figure 1:
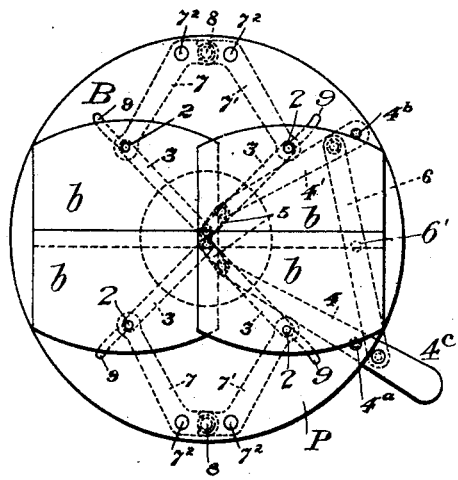

No. 709,500. Patented Sept. 23, 1902.
C. A. MULLER.
PHOTOGRAPHIC SHUTTER MECHANISM.
(Application filed Jan. 9, 1902.)

(No Model.)

Witnesses:—
F. C. Fliedner.

Inventor:
Charles A. Muller.
By his Attorney.
F. H. Richards.

THE NORRIS PETERS CO., PHOTO-LITHO., WASHINGTON, D. C.

UNITED STATES PATENT OFFICE.

CHARLES A. MULLER, OF NEW YORK, N. Y.

PHOTOGRAPHIC-SHUTTER MECHANISM.

SPECIFICATION forming part of Letters Patent No. 709,500, dated September 23, 1902.

Application filed January 9, 1902. Serial No. 88,978. (No model.)

*To all whom it may concern:*

Be it known that I, CHARLES A. MULLER, a citizen of the United States, residing in New York, in the county of New York and State of New York, have invented certain new and useful Improvements in Photographic-Shutter Mechanism, of which the following is a specification.

This invention relates to the construction of photographic shutters and furnishes a shutter mechanism especially adapted to meet the rigid requirements as to rapidity, smoothness, and facility of operation demanded of such camera adjuncts for high-class instantaneous work. A shutter embodying this invention, is moreover, of simple construction and compact in form.

In the drawings which accompany this specification there is set forth a shutter mechanism embodying my present invention, in which—

Figure 2:
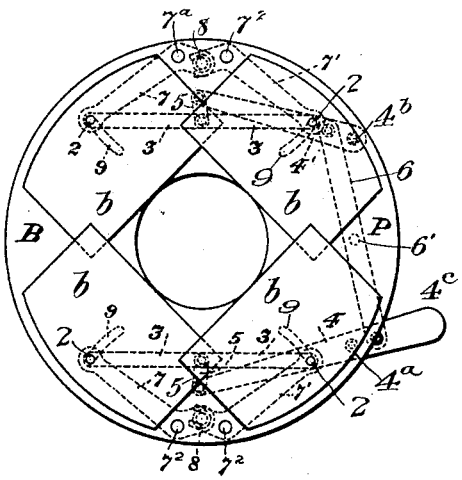
Figure 3:
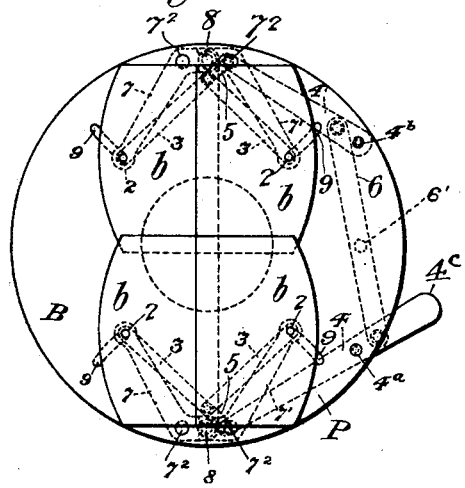
Figure 4:
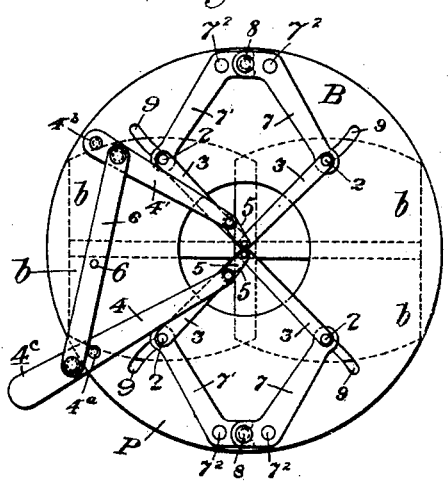

Figure 1 is an elevational view of such a mechanism, illustrating the shutter in its closed position with the sections thereof in one of the relative positions which they assume under the action of the operating mechanism. Fig. 2 is a similar view illustrating said sections in their relative positions while the exposure is being made. Fig. 3 is a view similar to Fig. 1, also illustrating the shutter as closed, but the sections thereof disposed in positions relatively to the operating mechanism corresponding to the relation established at the close of the movement of the shutter-operating mechanism from the position in Fig. 1 to that indicated in Fig. 3; and Fig. 4 is a view similar to Fig. 1, but looking at the opposite side of the mechanism.

Similar characters of reference designate corresponding parts in all figures.

As well known, it is common in the art to apply the term "shutter" generally, designating thereby the shiftable member, the mechanism by which it is operated, and the supports for maintaining the parts in proper relation. I have not in the drawings shown all of the features of such a photographic shutter, but have illustrated only the shutter proper, the mechanism for operating the same, and a supporting-plate upon which the parts are mounted, various accessory features—such as springs, an inclosing casing, &c.—being omitted, since the present invention relates more especially to the construction of the shutter proper and the organization therewith of mechanism for shifting the shutter-sections with relation to each other.

The shutter proper which I propose to use is a sectional one—that is to say, it comprises a number of independent shutter elements so mounted as to adapt each of the elements to be rotated through an angle sufficient to effect an exposure of the shutter-opening, followed by the closure of such opening as the angle of rotation increases.

In a shutter organized in accordance with the present invention the movement whereby the shifting from a closed to an open and again to a closed position is effected is, therefore, a continuous one, as distinguished from a movement which reverses in direction in order to close the opening after the parts have been shifted for exposure—that is to say, assuming the shutter-sections to be in a closed position, then after actuating the operating mechanism to move the sections away from the shutter-opening the movement of the mechanism which opens the sections is continued in order to again establish the relation among the shutter-sections such that the opening of the shutter is closed. There is thus no reversal to shift movement of the sections from a closed position to a closed position back, intervening between which the sections have been carried away from the shutter-opening and the exposure made. From one period of rest, therefore, to the succeeding period the movement is continuous, and by reason of the fact that the movement is continuous no inertia of the parts must needs be overcome in order to open and close the shutter. Such a mode of operation is particularly adapted to smoothness and rapidity of operation, and a shutter, therefore, comprising such an organization and operating in the foregoing manner is especially suited for purposes of instantaneous photography.

In an organization embodying the present improvements, moreover, both the opening and closing movements are comparatively rapid when once such movements are begun, while the movement of the shutter at the instant of full opening is a minimum, even though the operating mechanism by which the shutter is shifted is moved at a uniform rate from one extreme of its movement to the other.

The sections b of the shutter proper, which as a whole is designated in a general way by B, may be of various forms. I have here shown them each somewhat elongated in one direction and as being four in number. They may be of any proper material and dimensions, and for the purpose of rotating each of them, as aforesaid, each is provided with a laterally-extending pin 2, each pin in this instance extending through a supporting-plate P and having attached to it on that side of the plate opposite to which the shutter-sections are disposed a corresponding arm 3. For the purpose of accomplishing the most satisfactory operation of the shutter as respects a rapid opening and closing movement I prefer to carry each section thereof bodily outward during the opening of the shutter— that is to say, the organization is such as to render a movement in the nature of a translational movement to be impartible to each section in addition to the angular movement of which it is capable. I have therefore so related the various arms 3 to each other and with the operating mechanism that such bodily or translational movement of the shutter-sections may be effected. To this end the arms 3 are in this instance hinged to each other to form two pairs of pivotally-connected arms, the arms of each pair being normally disposed at an angle to each other. The straightening out of the arms of each pair—that is, a movement in such direction as to bring the connected arms more nearly in line with each other—will obviously not only accomplish this bodily separation of the associated sections of each pair from one another, but simultaneously with said bodily movement an angular movement of each of the shutter-sections will occur. This movement whereby the arms of the two pairs thereof are brought more nearly in line with each other will conveniently be accomplished by some lever device—such, for instance, as that illustrated and comprising two levers, (designated by 4 and 4', respectively,) each lever being in this case pivoted adjacent to one of its ends to the supporting-plate P. (See the pivotal connections $4^a$ and $4^b$, respectively.) The opposite end of each of these coöperating levers is pivotally connected to a corresponding link 5, each hinged to the pivotal connection between the adjacent pair of arms 3 3.

To render the two pairs of levers simultaneously operative, and thereby effect the concurrent and relative straightening out of each pair of levers and the angular movement of the several shutter-sections to which they are respectively connected, a link 6 may be used to hold the two levers in operative connection, this link being pivoted at one end on one side of the pivotal support of one lever 4 and on the opposite side of the corresponding support of the other lever 4'.

Did the operating mechanism for shifting the shutter-sections comprise only the features hereinbefore described a uniform and satisfactory movement of the sections would not be assured, since although the sections of a pair are connected one with the other for mutual separation and concurrent rotation, yet a uniform and harmonious action of all the sections might not be caused by the movement of the levers 4 4', owing to a variation in the friction of the pivotal connections or a lack of proper balance among the various features of the shutter proper and the operating mechanism. I therefore prefer to combine with the shutter-sections of a pair thereof means effective to guide them in their movements and to compel each section of the pair to move positively and simultaneously with the other section of the pair. The means herein provided for that purpose comprises for each pair of shutter elements a pair of connecting angle-levers, (designated by 7 and 7', respectively.) Each of these angle-levers is pivoted to the supporting-plate P, as at $7^2$, while an arm, here shown as the longer arm of each lever, loosely embraces the pin 2, extending from a shutter-section. In order to compel one angle-lever to move with the other, and hence the two shutter-sections of a pair to move together, the arms, here shown as the shorter arms of the angle-levers, are operatively connected one to the other—for instance, by a pin 8, extending from one arm and which engages a slot formed in the arm of the other lever.

It has already been stated that the shutter-sections are moved bodily to and fro during each single movement of the operating mechanism. If the angle-levers 7 and 7' described are pivoted relatively to the shutter-sections substantially as set forth in the various figures, a concurrent bodily separation of the corresponding shutter-sections, one in one pair and the opposite section in the other pair, will ensue, as well as a similar relative movement of the sections connected to each pair of articulated arms, each pin 2 traveling along an arc extending at an angle to the corresponding arc traveled by the pin of the opposite element of the other pair, the plate P having guideways to permit each pin to move freely. (See the curved slots 9.)

The relation between the parts hereinbefore described is such that when the arms 3 and 3, extending from a pair of the sections, are brought into alinement with each other the sections will have moved from a position such as indicated in Fig 1 to position such as set forth in Fig. 2. In this latter figure it will be understood that each pair of arms 3 and 3, as aforesaid, are disposed in line with each other and that the pins 2, extending from each pair of sections, will have been separated from each other to their greatest distance. Upon continuing the movement of the levers 4 and 4', which has caused the sections to assume the position in Fig. 2, the two arms 3 and 3 of each pair now begin to take a reversed angular relation to each other. With this reversed angular relation of the arms of a pair thereof the two connected pins 2 will approach each other, although the angular movement of the pins, and hence the shutter-sections from which they extend, will continue in the same direction—that is to say, during this latter portion of the continuous movement or throw of the levers 4 and 4' the sections will approach each other until finally the aperture through the shutter is completely shrouded by the overlapping of the sections, whose final positions may be determined by suitable stops—such, for instance, as the inner ends of the slots 9 with the sections, as illustrated in Fig. 3. Although the arc through which each arm 3 swings is not limited to any particular amount, so far as the scope of the invention is concerned, this arc may be made substantially equal to ninety degrees, and hence each shutter-section will be turned to a corresponding angular extent. Upon the movement of the levers 4 and 4' in the opposite direction a reversed series of relations is established, the shutter elements moving from a position of rest, as in Fig. 3, to a position as in Fig. 2, finally resuming a normal position, such as indicated in Fig. 1.

It is evident from the relation existing between the arms 3 that the movements of the two pins 2, extending from the shutter-sections of a pair, will be most rapid when the arms make the smallest angle with each other for greater angles—that is, as the sections approach toward or advance from their open position the speed decreases. The smallest angle between the two arms of a pair correspond to the closed position of the shutter-sections, and hence the movement of such sections will be most rapid at the instant of separation and final closing.

In order to insure the correct superposed relation of the shutter-sections, I prefer that they shall always to some extent lap one over the other, especially when separated to their greatest extent. This overlapping is indicated in Fig. 2, and ordinarily the sections will also overlap to a considerable extent when the shutter is in its closed position in order that the filtration of light through the shutter-aperture may be effectually precluded.

Although it is usual in the art to employ one or more springs for effecting and controlling the operation of the shutter proper, I have not in the drawings represented such device, as such impelling and controlling devices may be variously combined with the mechanism illustrated. The lever 4 is also illustrated as provided with a rearward projection 4$^c$, constituting an operating-handle. Power for operating the shutter may be applied through this handle, although I may apply the same direct to the link 6, utilizing a pin 6' thereon as the means of application.

Having described my invention, I claim—

1. In a shutter mechanism the combination with a plurality of overlapping shutter-sections each having the form of an elongated rectangle, three of whose intersecting sides are disposed substantially at right angles to each other of operating mechanism for rotating each of said shutter-sections.

2. In a shutter mechanism the combination with a plurality of shutter-sections mounted for combined angular and translational movement, of means for turning each of said sections and shifting the same bodily away from and toward the axis of the shutter-aperture.

3. In a shutter mechanism the combination with a plurality of shutter-sections mounted for combined angular and translational movement of means for turning each of said sections and simultaneously shifting the same first away from and then toward the axis of the shutter-aperture.

4. In a shutter mechanism the combination with a plurality of shutter-sections of operating mechanism movable from one position to another and back again for accomplishing during each of such forward and backward movements the opening and the closing of the shutter-aperture.

5. In a shutter mechanism, the combination with a shutter proper mounted for combined angular and translational movement, of operating mechanism movable from one position to another and back again for accomplishing during each of such forward and backward movements the turning and the bodily shifting of said shutter first away from, and then toward the shutter-aperture.

6. In a shutter mechanism, the combination with a shutter proper mounted for combined angular and translational movement, of an arm secured to the shutter, and mechanism operatively connected with the arm for turning the shutter about an axis and carrying it bodily to and fro.

7. In a shutter mechanism the combination with a pair of shutter-sections mounted for combined angular and translational movement of operating mechanism movable from one position to another and back again for accomplishing during each of such forward and backward movements the opening and closing of the shutter-aperture.

8. In a shutter mechanism the combination with a pair of shutter-sections mounted for combined angular and translational movement of operating mechanism movable from one position to another and back again for accomplishing during each of such forward and backward movements the turning and simultaneous bodily movement to and fro of each of said sections.

9. In a shutter mechanism the combination with a pair of shutter-sections of arms secured thereto and pivotally connected together and means for shifting the arms from one angular relation to another.

10. In a shutter mechanism the combination with a pair of shutter-sections of arms secured thereto and pivotally connected together, and a lever for shifting the arms from one angular relation to another.

11. In a shutter mechanism the combination with a pair of shutter-sections of arms secured thereto and pivotally connected together, and a lever for shifting the arms from one angular relation to another during each throw of the lever.

12. In a shutter mechanism the combination with a pair of shutter-sections of arms secured thereto and pivotally connected together, means for shifting the arms from one angular relation to another, and means for guiding the sections during their movements.

13. In a shutter mechanism the combination with a pair of shutter-sections of arms secured thereto and pivotally connected together, a lever for shifting the arms from one angular relation to another, and means for guiding the sections during their movements.

14. In a shutter mechanism the combination with a pair of shutter-sections of arms secured thereto and pivotally connected together, a lever for shifting the arms from one angular relation to another during each throw of the lever, and means for guiding the sections during their movements.

15. In a shutter mechanism, the combination with a pair of shutter-sections of jointed angularly-disposed arms secured thereto, a pair of articulated levers for guiding the sections during their movements, and an operating-lever for bringing said arms into alinement with each other and reversing their angular relation during each throw of the operating-lever.

16. In a shutter mechanism, the combination with a pair of shutter-sections of jointed angularly-disposed arms secured thereto, a pair of articulated levers for guiding the sections during their movements, and an operating-lever for bringing said arms into alinement with each other and reversing their angular relation during each throw of the operating-lever, and a supporting-plate upon which the parts are mounted.

17. In a photographic shutter, the combination with oppositely-disposed pairs of shutter-sections of angularly-disposed arms secured to the sections and pivotally connected together in pairs and means for bringing the jointed arms of each pair into alinement with each other and reversing their angular relation during a continuous movement of said operating means.

18. In a photographic shutter, the combination with oppositely-disposed pairs of shutter-sections of angularly-disposed arms secured to the sections and pivotally connected together in pairs and operating-levers for bringing the jointed arms of each pair into alinement with each other and reversing their angular relation during a continuous throw of said operating-levers.

19. In a photographic shutter, the combination with oppositely-disposed pairs of shutter-sections of jointed angularly-disposed pairs of arms secured to the sections, articulated levers for guiding the sections during their movements and compelling their simultaneous action, and operating-levers for bringing the jointed arms of each pair into alinement with each other and reversing their angular relation during the continuous throw of said operating-levers.

20. In a photographic shutter, the combination with oppositely-disposed pairs of shutter-sections of jointed angularly-disposed pairs of arms secured to the sections, articulated levers for guiding the sections during their movements and compelling their simultaneous action, and operatively-connected operating-levers connected to said pairs of jointed arms for bringing each pair of arms into alinement with each other and reversing their angular relation during each throw of said operating-levers.

21. In a photographic shutter, the combination with oppositely-disposed pairs of shutter-sections having projecting pins, of jointed angularly-disposed pairs of arms secured to said pins, articulated levers for guiding the sections during their movements and compelling their simultaneous action, and operatively-connected operating-levers connected to said pairs of jointed arms for bringing each pair of arms into alinement with each other and reversing their angular relation during each throw of said operating-levers, and a supporting-plate upon which the parts are mounted and through which said pins extend.

22. In a photographic shutter, the combination with oppositely-disposed pairs of shutter-sections, of angularly-disposed arms secured to the sections and pivotally connected together in pairs, and operating means for simultaneously bringing the jointed arms of each pair into alinement with each other and reversing their angular relation during the continuous movement of such operating means.

23. In a photographic shutter, the combination with a plurality of shutter-sections, of angularly-disposed arms secured to the sections and pivotally connected together in pairs; operating-levers, one for each pair of jointed arms, for bringing the arms of the pair into alinement with each other and reversing their angular relation during a continuous throw of the connected operating-lever; and a link connecting said levers.

24. In a photographic shutter, the combination with a plurality of shutter-sections of angularly-disposed arms secured to the sections and pivotally connected together in pairs; operating-levers, one for each pair of jointed arms, for bringing the arms of the pair into alinement with each other and reversing their angular relation during a continuous throw of the connected lever; and a link extending from each operating-lever to the corresponding pair of arms.

25. In a photographic shutter, the combination with a plurality of shutter-sections of angularly-disposed arms secured to the sections and pivotally connected together in pairs; operating-levers, one for each pair of jointed arms, for bringing the arms of the pair into alinement with each other and reversing their angular relation during a continuous throw of the connected lever; a link extending from each lever to the joint between the corresponding pair of arms; and a link connecting said levers.

CHARLES A. MULLER.

Witnesses:
PIERSON L. WELLS,
CHAS. LYON RUSSELL.